United States Patent
Nojiri

(10) Patent No.: US 12,146,800 B2
(45) Date of Patent: Nov. 19, 2024

(54) TEMPERATURE SENSOR AND DEVICE EQUIPPED WITH TEMPERATURE SENSOR

(71) Applicant: SEMITEC Corporation, Tokyo (JP)

(72) Inventor: Toshiyuki Nojiri, Tokyo (JP)

(73) Assignee: SEMITEC Corporation, Tokyo (JP)

( * ) Notice: Subject to any disclaimer, the term of this patent is extended or adjusted under 35 U.S.C. 154(b) by 627 days.

(21) Appl. No.: 17/265,513

(22) PCT Filed: Aug. 6, 2019

(86) PCT No.: PCT/JP2019/030893
§ 371 (c)(1),
(2) Date: Feb. 2, 2021

(87) PCT Pub. No.: WO2020/032021
PCT Pub. Date: Feb. 13, 2020

(65) Prior Publication Data
US 2021/0223114 A1    Jul. 22, 2021

(30) Foreign Application Priority Data
Aug. 10, 2018 (JP) .................. 2018-152022

(51) Int. Cl.
*G01K 7/22* (2006.01)
*G01K 1/20* (2006.01)
*H01C 7/00* (2006.01)

(52) U.S. Cl.
CPC .............. *G01K 7/22* (2013.01); *G01K 1/20* (2013.01); *H01C 7/006* (2013.01); *H01C 7/008* (2013.01)

(58) Field of Classification Search
CPC .......... H01C 7/008; H01C 7/006; G01K 1/20; G01K 7/22
See application file for complete search history.

(56) References Cited

U.S. PATENT DOCUMENTS

| 3,886,578 A | * | 5/1975 | Eastwood | .............. H01C 7/041 |
| | | | | 257/769 |
| 5,406,246 A | * | 4/1995 | Friese | ...................... G01K 7/18 |
| | | | | 338/307 |

(Continued)

FOREIGN PATENT DOCUMENTS

| CN | 105899921 | 8/2016 |
| EP | 1466766 B1 * | 12/2006 | ......... B60H 1/00792 |

(Continued)

OTHER PUBLICATIONS

EP1466766 machine translation (Year: 2006).*

(Continued)

*Primary Examiner* — Kyung S Lee
(74) *Attorney, Agent, or Firm* — JCIPRNET

(57) ABSTRACT

Provided are a thin and insulating temperature sensor which is heat resistant and can have improved reliability, responsiveness, and temperature measurement accuracy, and a device equipped with the temperature sensor, the temperature sensor being provided with: a heat sensitive element which has an insulating substrate, a heat sensitive film formed on the insulating substrate, and electrode layers formed on the insulating substrate and electrically connected to the heat sensitive film; a lead member having joint parts electrically connected to the electrode layers by being joined thereto by means of welding, and lead parts integrally extending from the joint parts; and a pair of insulating films which sandwich and seal at least the heat sensitive element and the joint parts of the lead member from both sides.

15 Claims, 12 Drawing Sheets

(56) References Cited

U.S. PATENT DOCUMENTS

| | | | | |
|---|---|---|---|---|
| 5,410,291 | A | * | 4/1995 | Kuzuoka .............. G01D 11/245 |
| | | | | 374/185 |
| 5,610,571 | A | * | 3/1997 | Kuzuoka .............. G01D 11/245 |
| | | | | 338/325 |
| 5,831,512 | A | * | 11/1998 | Wienand ................ G01K 7/183 |
| | | | | 338/22 SD |
| 6,762,671 | B2 | * | 7/2004 | Nelson ................... G01K 7/223 |
| | | | | 374/185 |
| 11,215,514 | B2 | * | 1/2022 | Hirabayashi ............. G01K 7/18 |

FOREIGN PATENT DOCUMENTS

| | | |
|---|---|---|
| JP | H08128901 | 5/1996 |
| JP | 2505631 | 7/1996 |
| JP | H10261386 | 9/1998 |
| JP | H11131778 | 5/1999 |
| JP | 2000074752 | 3/2000 |
| JP | 2001199382 | 7/2001 |
| JP | 2004205417 | 7/2004 |
| JP | 2008241566 | 10/2008 |
| JP | 2010197163 | 9/2010 |
| JP | 2014145655 | 8/2014 |
| JP | 5707081 | 4/2015 |
| JP | 5763805 | 8/2015 |
| JP | 2015219396 | 12/2015 |
| JP | 2016045130 | 4/2016 |
| JP | 2017161332 | 9/2017 |
| JP | 2017166988 | 9/2017 |
| WO | 2017047512 | 3/2017 |
| WO | 2018066473 | 4/2018 |

OTHER PUBLICATIONS

"International Search Report (Form PCT/ISA/210) of PCT/JP2019/030893," mailed on Nov. 5, 2019, with English translation thereof, pp. 1-4.

"Office Action of China Counterpart Application", issued on Apr. 19, 2024, with English translation thereof, p. 1-p. 17.

"Office Action of China Counterpart Application", issued on Jan. 27, 2024, with English translation thereof, p. 1-p. 17.

Office Action of China Counterpart Application, with English translation thereof, issued on Aug. 2, 2023, pp. 1-20.

"Office Action of China Counterpart Application", issued on Jun. 25, 2024, with English translation thereof, pp. 1-17.

* cited by examiner (a)

(b)

TEMPERATURE SENSOR AND DEVICE EQUIPPED WITH TEMPERATURE SENSOR

CROSS-REFERENCE TO RELATED APPLICATION

This application is a 371 application of an international PCT application serial no. PCT/JP2019/030893, filed on Aug. 6, 2019, which claims the priority benefit of Japan application JP2018-152022, filed on Aug. 10, 2018. The entirety of the above-mentioned patent application is hereby incorporated by reference herein and made a part of this specification.

TECHNICAL FIELD

The present invention relates to a temperature sensor suitable for detecting a temperature of a detection target and a device equipped with the temperature sensor.

BACKGROUND ART

Temperature sensors for detecting a temperature of a detection target are provided in electronic equipment including OA equipment such as copiers and printers, information communication equipment such as mobile communication terminals and personal computers, video equipment, consumer equipment, and electrical equipment for automobiles.

In recent years, there has been demand for miniaturizing such electronic equipment, and in response to this demand, development has been carried out to reduce the thicknesses of temperature sensors.

In the related art, a heat sensitive resistive element and a lead wire forming a temperature sensor are joined generally by means of soldering, a conductive paste, or the like. For this reason, an additional material such as a brazing material like a solder paste or a conductive paste is used in joining. In a case of joining with an additional material added to a joint part, a thickness of the joint part may become as thick as about 30 μm to 100 μm, and thus a problem of an increasing heat capacity and deteriorating thermal responsiveness and temperature measurement accuracy may arise. In addition, in joining with solder, a heat-resisting temperature in consideration of temperature cycles becomes 150° C. or lower, and thus a problem that it is not possible to ensure heat resistance against a temperature of 200° C. or higher may arise.

Meanwhile, in order to make temperature sensors thinner, a technique of using a flexible wiring board (FPC) to join a heat sensitive resistive element to a wiring pattern formed on the flexible wiring board by means of welding has been attempted. However, in this case, the insulating layer of the flexible wiring board is irradiated with laser light coming from the welding, and thus a problem that the insulation layer is partially removed and thus the insulation deteriorates arises (e. g., refer to FIG. 12 of Patent Literature 2).

CITATION LIST

Patent Literature

[Patent Literature 1]
WO 2017/047512
[Patent Literature 2]
WO 2018/066473
[Patent Literature 3]
Japanese Patent Laid-Open No. 2000-74752A
[Patent Literature 4]
Japanese Patent No. 5707081
[Patent Literature 5]
Japanese Patent No. 5763805
[Patent Literature 6]
Japanese Patent Laid-Open No. 2015-219396A
[Patent Literature 7]
Japanese Patent Laid-Open No. 2016-45130A
[Patent Literature 8]
Publication of Utility Model Registration No. 2505631
[Patent Literature 9]
Japanese Patent Laid-Open No. 2008-241566A
[Patent Literature 10]
Japanese Patent Laid-Open No. 2010-197163A

SUMMARY OF INVENTION

Technical Problem

An objective of the present invention is to provide a thin and insulating temperature sensor which is heat resistant and can have improved reliability, responsiveness, and temperature measurement accuracy, and a device equipped with the temperature sensor.

Solution to Problem

A temperature sensor according to an embodiment of the present invention includes a heat sensitive element having an insulating substrate, a heat sensitive film formed on the insulating substrate, and an electrode layer formed on the insulating substrate and electrically connected to the heat sensitive film, a lead member having a joint part electrically connected to the electrode layer by being joined to the electrode layer by means of welding and a lead part integrally extending from the joint part, and a pair of insulating films sandwiching and sealing at least the heat sensitive element and the joint part of the lead member from both sides.

Advantageous Effects of Invention

According to the present invention, it is possible to provide a heat-resistant temperature sensor which can have improved responsiveness and temperature measurement accuracy by being thinned and reliability with ensured insulation, and a device equipped with the temperature sensor.

DESCRIPTION OF EMBODIMENTS

Figure 1:
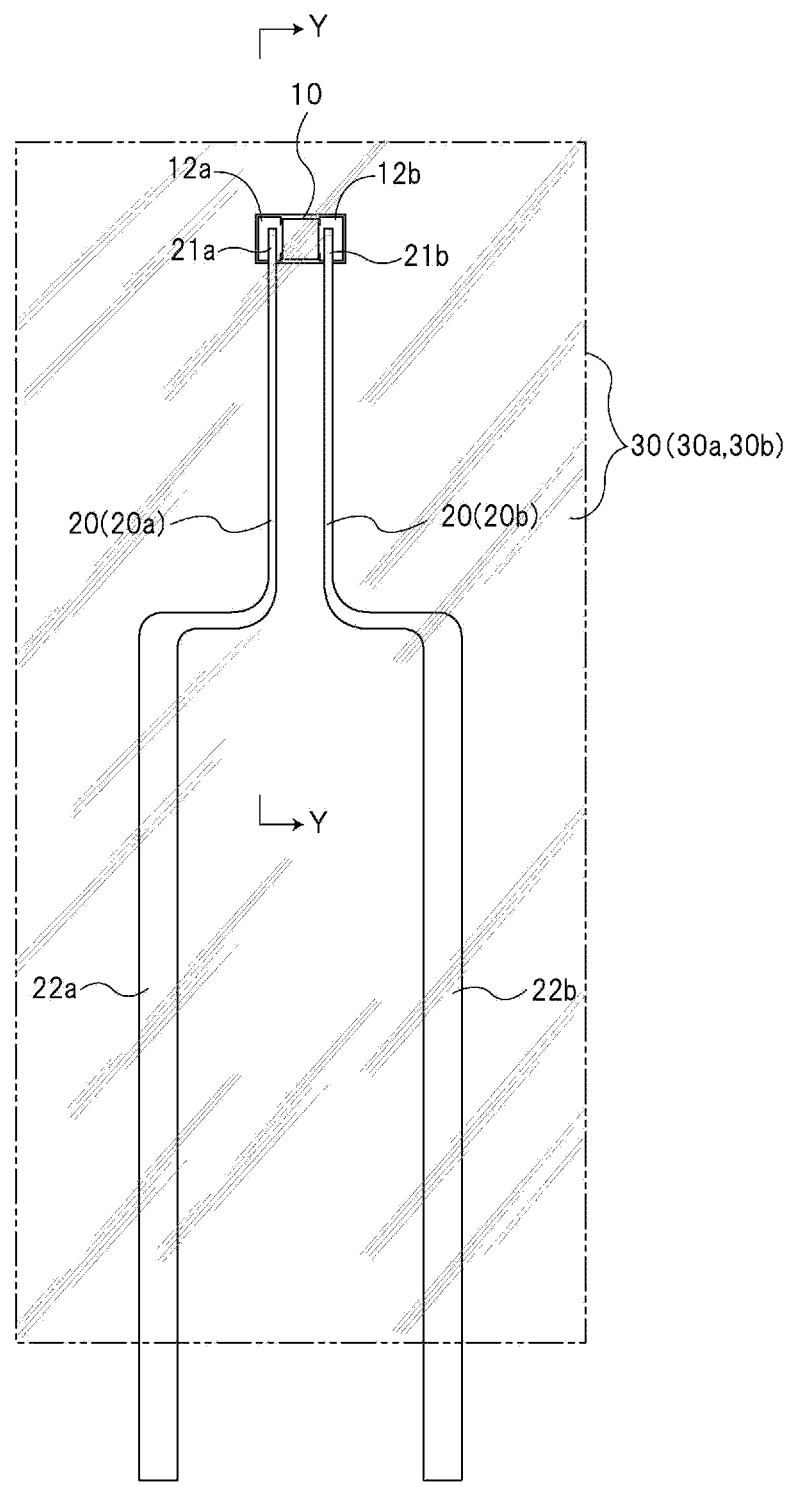
FIG. 1 is a plan view illustrating a state in which a heat sensitive element is insulation-coated by insulating films according to a first embodiment of the present invention.

A temperature sensor according to an embodiment of the present invention will be described with reference to FIGS. 1 to 20. Further, the scales of respective members may have been appropriately changed in each drawing for the sake of illustration in order to make the members have a recognizable size. In addition, the same reference numerals are given to the same or equivalent parts, and overlapping description is omitted.

First Embodiment

Figure 2:
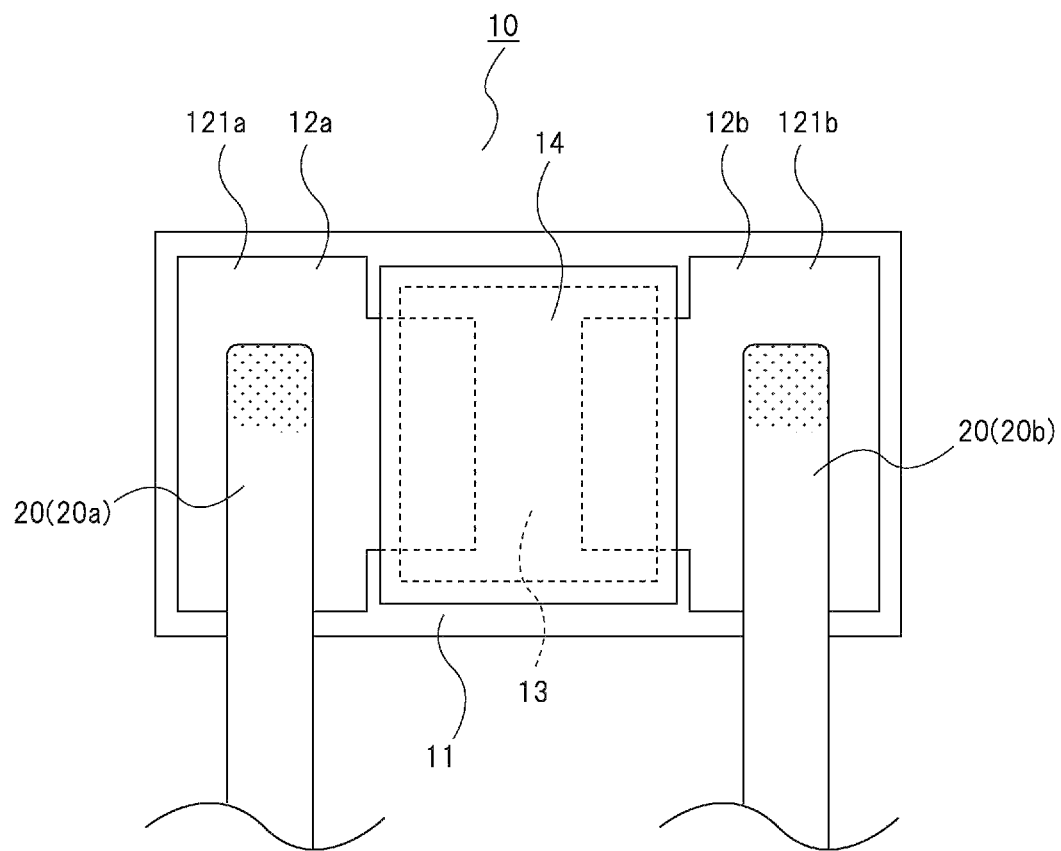
FIG. 2 is a plan view illustrating the heat sensitive element.
Figure 3:
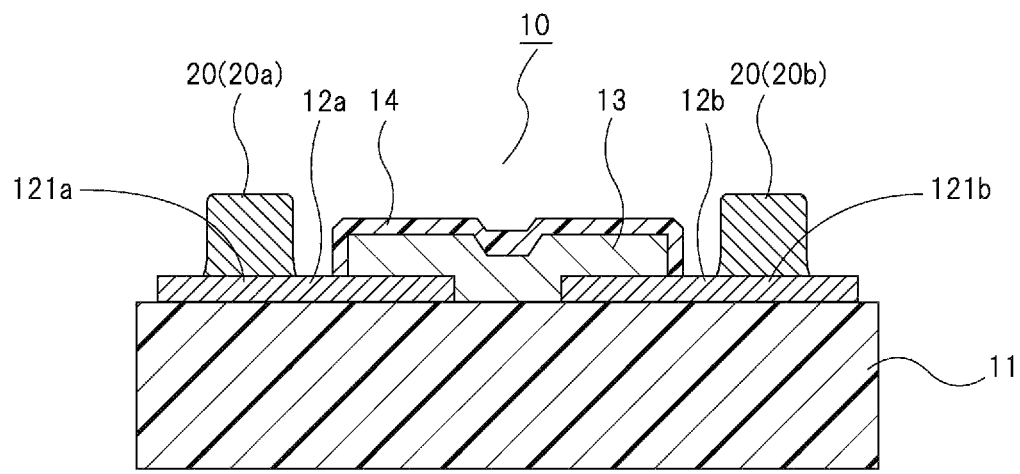
FIG. 3 is a cross-sectional view illustrating the heat sensitive element.
Figure 7:
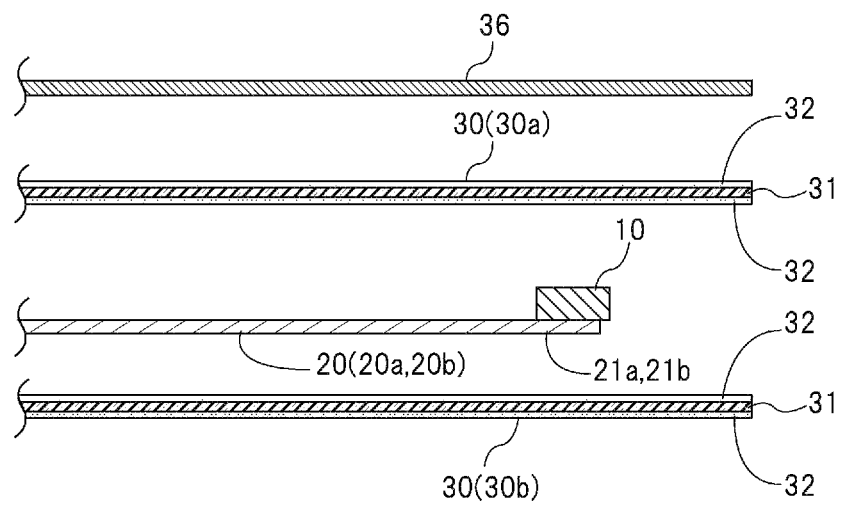
FIG. 7 is a cross-sectional view illustrating a modified example (Example 2) of a state before the heat sensitive element is similarly insulation-coated by the insulating films.
Figure 8:
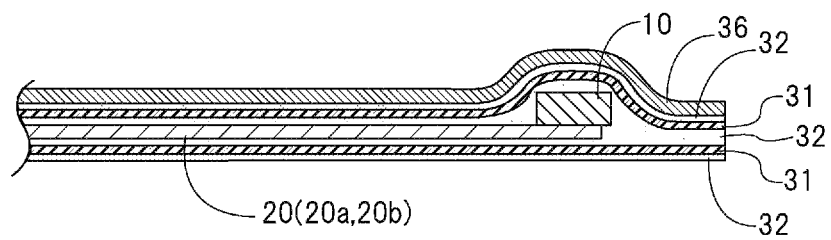
FIG. 8 is a cross-sectional view illustrating the modified example (Example 2) of a state after the heat sensitive element is insulation-coated by the insulating films.
Figure 9:
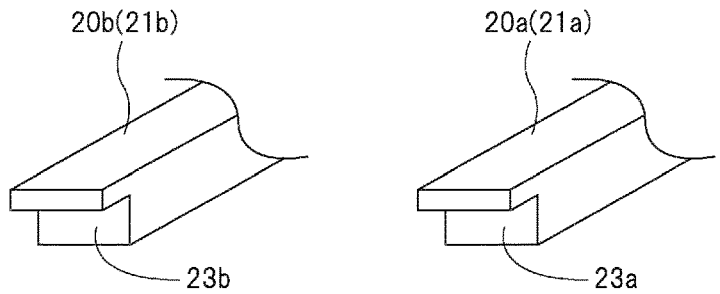
FIGS. 9(a) and (b) illustrate a modified example illustrating a state in which the heat sensitive element is jointed to lead members with a perspective view of the lead members and a cross-sectional view of joint parts.
Figure 9:
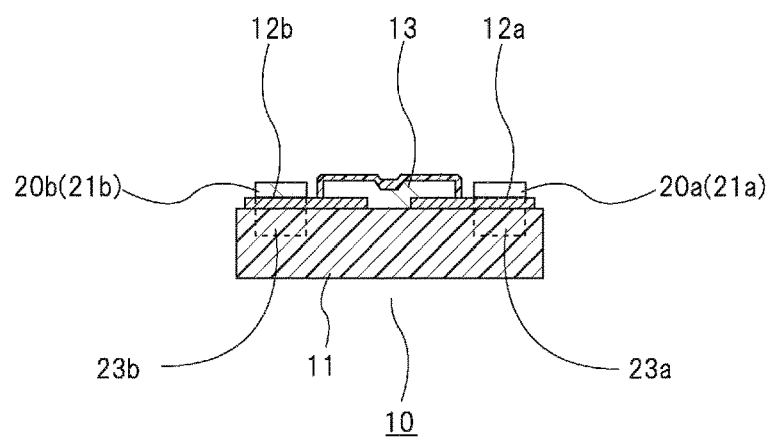
Figure 10:
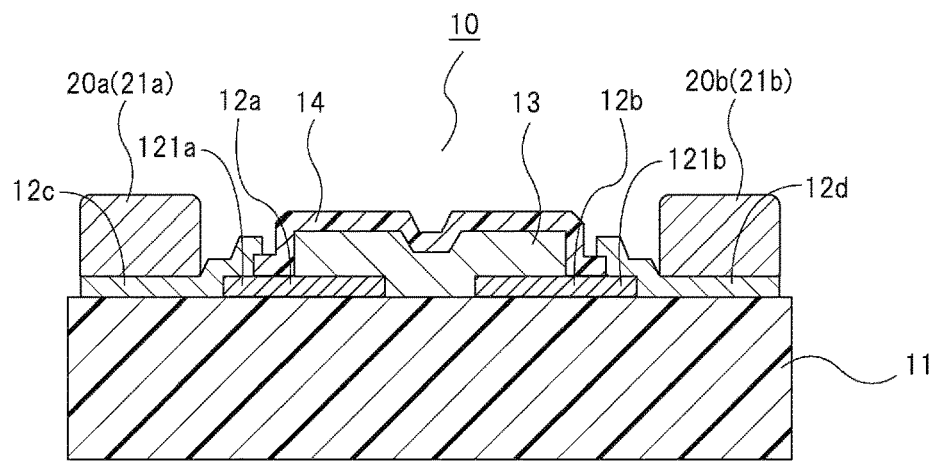
FIG. 10 is a cross-sectional view illustrating another embodiment (second embodiment) of the heat sensitive element.
Figure 11:
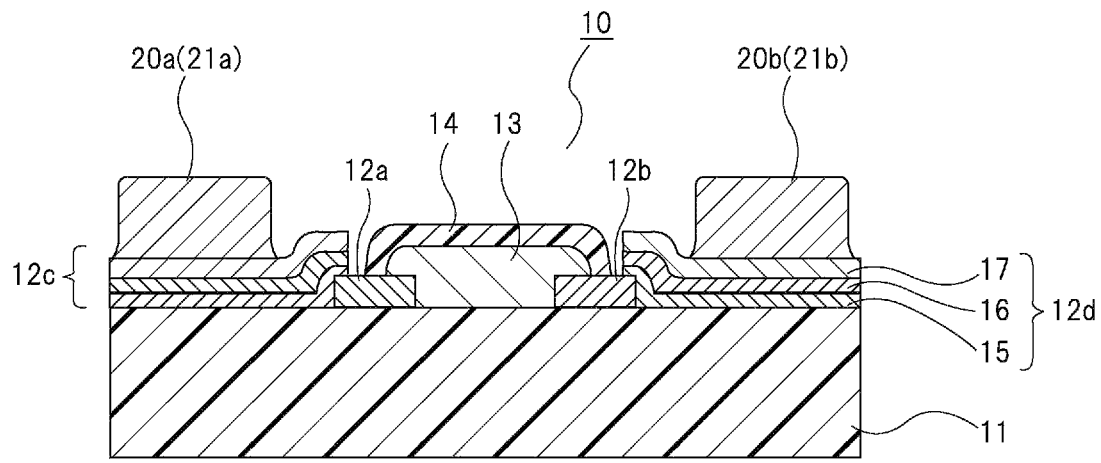
FIG. 11 is a cross-sectional view illustrating the embodiment (second embodiment).
Figure 12:
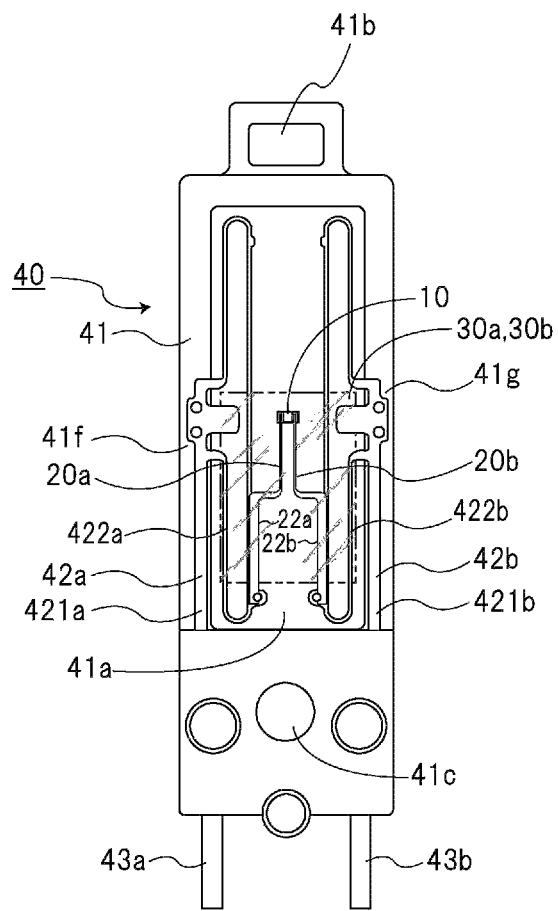
FIG. 12 is a plan view illustrating a proximity non-contact temperature sensor as the temperature sensor.
Figure 13:
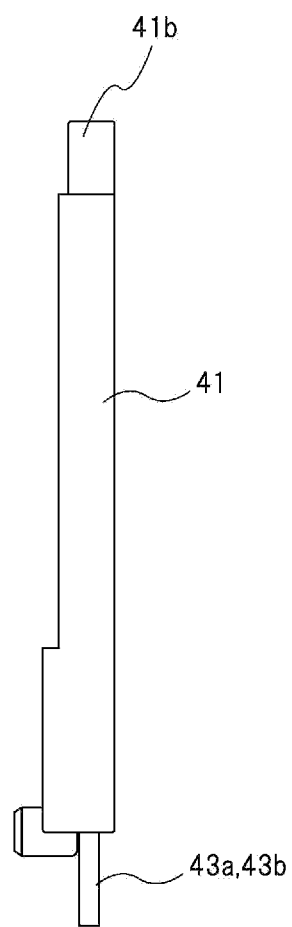
FIG. 13 is a side view illustrating the proximity non-contact temperature sensor as the temperature sensor.
Figure 14:
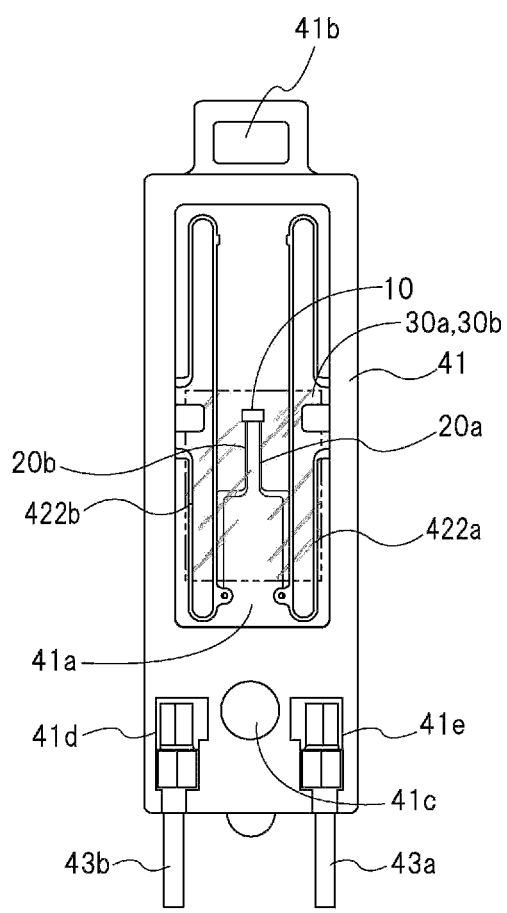
FIG. 14 is a back view illustrating the proximity non-contact temperature sensor as the temperature sensor.
Figure 15:
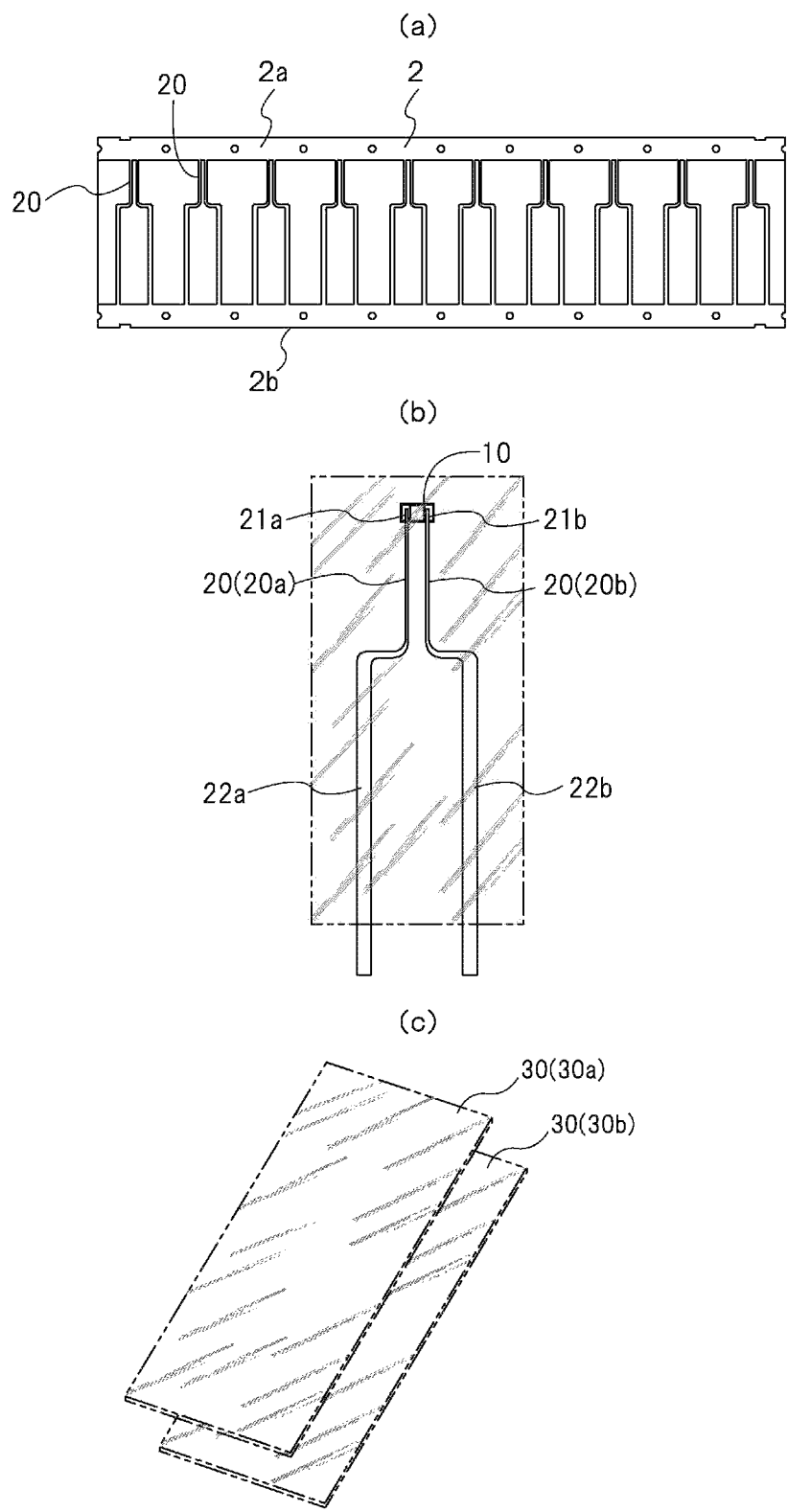
FIGS. 15(a) to (c) are component views illustrating members to be prepared in a manufacturing method for the temperature sensor.
Figure 16:
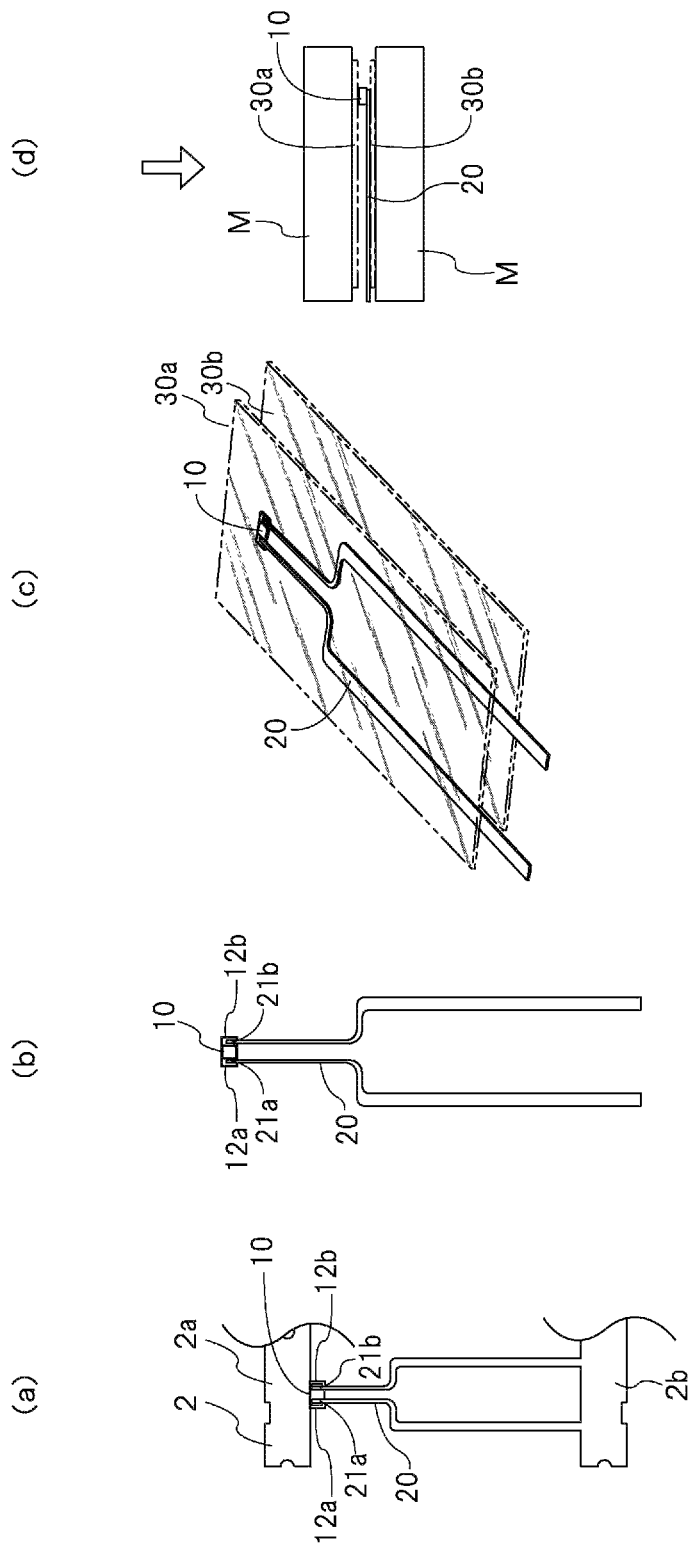
FIGS. 16(a) to (d) are explanatory views illustrating manufacturing processes in the manufacturing method for the temperature sensor.

A first embodiment will be described with reference to FIG. 1 to FIG. 16(d). FIG. 1 illustrates a state of a temperature sensor in which a heat sensitive element is insulation-coated by insulating films, FIGS. 2 and 3 illustrate a heat sensitive element, and FIGS. 4 to 8 illustrate a state in which the heat sensitive element is insulation-coated by the insulating films. FIG. 9 is a modified example illustrating a state in which the heat sensitive element is joined to lead members, and FIGS. 10 and 11 illustrate another embodiment of the heat sensitive element. In addition, FIGS. 12 to 14 illustrate the temperature sensor, and FIGS. 15(a) to (c) and FIGS. 16(a) to (d) illustrate a manufacturing method for the temperature sensor.

The temperature sensor according to the present embodiment includes the heat sensitive element 10, the lead members 20, and the insulating films 30 as illustrated in FIG. 1.

Referring to FIGS. 2 and 3 together, the heat sensitive element 10 is a surface mount type and has an insulating substrate 11, a pair of electrode layers 12a and 12b as electrode parts, a heat sensitive film 13, and a protective film 14.

The heat sensitive element 10 is a heat sensitive resistive element and specifically a thin film thermistor. The heat sensitive element 10 is formed in a nearly rectangular parallelepiped shape, and has a horizontal size of 1.0 mm, a vertical size of 0.5 mm, and a total thickness of 100 μm. A shape and a size are not particularly limited and can be appropriately decided according to an application as long as the element can be made thinner and smaller.

The insulating substrate 11 has substantially a rectangular shape, and is formed using a ceramic material such as insulating zirconia, silicon nitride, alumina or a mixture containing at least one kind thereof. The insulating substrate 11 is formed to be thin and have a thickness of 100 μm or less, or preferably 50 μm or less. In addition, a bending strength of the insulating substrate 11 is 690 MPa or greater, and an average particle size after firing of the ceramic material is 0.1 μm to 2 μm. By setting the range of the average particle size as described above, a bending strength of 690 MPa or greater can be secured, and cracking occurring during production of the thin insulating substrate 11 can be prevented. In addition, because the thickness of the insulating substrate 11 is thin, a heat capacity thereof can be reduced.

The pair of electrode layers 12a and 12b are formed on the insulating substrate 11, electrically connected to the heat sensitive film 13, and disposed to face each other with a predetermined interval therebetween. In more detail, the pair of electrode layers 12a and 12b are formed by thinning a metal thin film to have a thickness of 1 μm or less using a thin film formation technique such as a sputtering method, and for a metal material thereof, precious metals such as gold (Au), silver (Ag), copper (Cu), platinum (Pt), and palladium (Pd) and an alloy thereof, for example, an Ag—Pd alloy, and the like are applied.

Further, the pair of electrode layers 12a and 12b are portions to which lead members, which will be described below, are joined by welding, and as a low melting point metal, gold (Au having a melting point of 1064° C.), silver (Ag having a melting point of 961° C.), copper (Cu having a melting point of 1085° C.) or an alloy containing at least one kind thereof as a main component is preferably used. In addition, although the electrode layers 12a and 12b are formed below the heat sensitive film 13 in the present embodiment, the electrode layers may be formed on or in the middle of the heat sensitive film 13.

The heat sensitive film 13 is a heat sensitive thin film, and a thermistor thin film made of an oxide semiconductor having a negative temperature coefficient. The heat sensitive film 13 is formed on the electrode layers 12a and 12b using a thin film formation technique such as a sputtering method to straddle the electrode layers 12a and 12b, and electrically connected to the electrode layers 12a and 12b.

The heat sensitive film 13 is composed of elements of two or more kinds selected from transition metal elements including manganese (Mn), nickel (Ni), cobalt (Co), iron (Fe), and the like, and composed of a thermistor material containing a composite metal oxide having a spinel-type crystal structure as a main component. In addition, a sub-component may be included to improve characteristics or the like. A composition and content of a main component and sub-components can be appropriately determined according to desired characteristics.

The protective film 14 covers the region in which the heat sensitive film 13 is formed and covers the electrode layers 12a and 12b by causing exposed parts 121a and 121b to be formed by exposing at least a part of the electrode layers 12a and 12b. The protective film 14 can be formed by forming a film of silicon dioxide, silicon nitride, or the like using a thin film formation technique such as a sputtering method, or by forming lead glass, borosilicate glass, lead borosilicate glass, or the like using a printing method.

The heat sensitive element 10 is joined to the pair of lead members 20a and 20b by means of welding to be electrically connected thereto. The lead members 20a and 20b are elastic bodies having elasticity formed by means of chemical etching or pressing, and are plate-shaped thin metal plates having a narrow width, and lead frames. In addition, a thickness of the lead members 20 is 100 µm or less, or preferably about 30 µm. In addition, a heat conductivity of the lead member 20 is preferably 25 W/(m·K) or less.

Specifically, the lead members 20a and 20b are formed to have joint part 21a and 21b and lead parts 22a and 22b integrally extending from the joint parts 21a and 21b. The joint parts 21a and 21b are parts joined to the electrode layers 12a and 12b of the heat sensitive element 10 by welding and are disposed in a direction orthogonal to the direction in which the electrode layers 12a and 12b are disposed side by side. The lead parts 22a and 22b bend outward from the joint parts 21a and 21b and extend in the direction parallel to the joint parts 21a and 21b. A width of the joint parts 21a and 21b joined to the electrode layers 12a and 12b of the heat sensitive element 10 is formed to be narrower than a width of the lead parts 22a and 22b. Tips of the joint parts 21a and 21b are joined to the heat sensitive element 10 to be connected in the form of a bridge.

The lead members 20a and 20b are made of a low melting point metal, that is, a metal having a melting point of 1300° C. or lower, and a copper alloy containing copper as a main component, for example, phosphor bronze, constantan, manganin, or the like is used.

In a case in which the electrode layers 12a and 12b of the heat sensitive element 10 are joined to the lead members 20a and 20b by, for example, laser welding, the lead members 20a and 20b do not reach a melting point of 1300° C. or higher even if they are heated by laser light or the like and melted because the melting point thereof is 1300° C. or lower. Thus, because a temperature does not exceed a melting point of 1600° C. to 2100° C. of the ceramic substrate, damage to the electrode layers 12a and 12b of the heat sensitive element 10 or the insulating substrate 11 directly below the electrode layers 12a and 12b can be prevented and the lead members 20a and 20b can be joined thereto. In addition, in this case, because no additional material such as a bump is used, the members are not joined in a state in which an additional material is substantially added to the connection (joining) site, a thickness does not increase, a heat capacity does not increase as well, and thermal responsiveness can be thus increased.

In the related art, an iron-based metal such as stainless steel, Kovar, or a nickel alloy is used for the lead members described above. An iron-based metal has a high melting point, and for example, since both stainless steel and Kovar are iron-based alloys, a temperature of these alloys may be increased to about the melting point of an iron of 1538° C. If the lead members which are high melting point metals described above are irradiated with laser light for laser welding, the lead members and the surroundings are heated to a high temperature, which causes a problem that the insulating substrate (e. g., aluminum substrate) is likely to become damaged. In addition, in joining with solder, a heat-resisting temperature in consideration of temperature cycles becomes 150° C. or lower, and thus a problem that it is not possible to ensure heat resistance against a temperature of 200° C. or higher may arise.

According to the configuration of the present embodiment described above, heat resistance against a temperature of 200° C. or higher can be ensured, and thus the above problems can be solved. Further, the lead members may have a cross section formed of a round wire material having a circular cross section or a flat wire, and in this case, an outer diameter or a thickness is 100 µm or less. Preferably, the lead members are formed to be thin and have an outer diameter or a thickness of 50 µm or less. For the wire material, a copper-silver alloy wire having a high tensile strength or the like is preferably used.

In the state in which the lead members 20a and 20b are connected to the heat sensitive element 10, the pair of insulating films 30a and 30b seal and coat at least the heat sensitive element 10 and the joint parts 21a and 21b of the lead members 20 while sandwiching at least the element and the parts from both sides as illustrated in FIG. 1.

Figure 4:
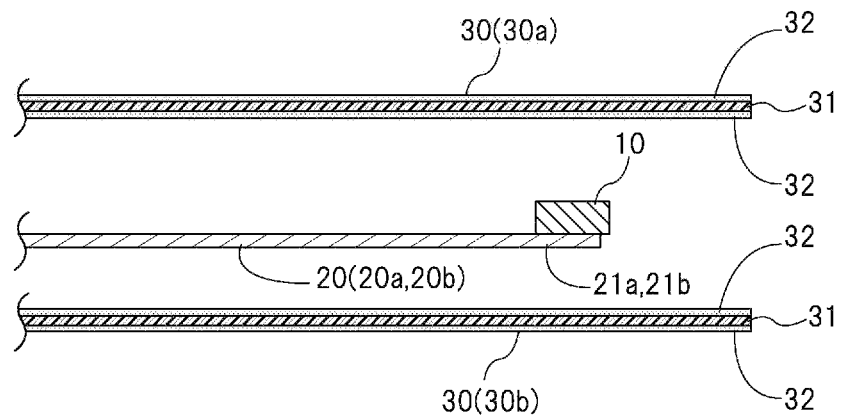
FIG. 4 is a cross-sectional view illustrating a state before the heat sensitive element is insulation-coated by the insulating films, taken along the line Y-Y of FIG. 1.
Figure 5:
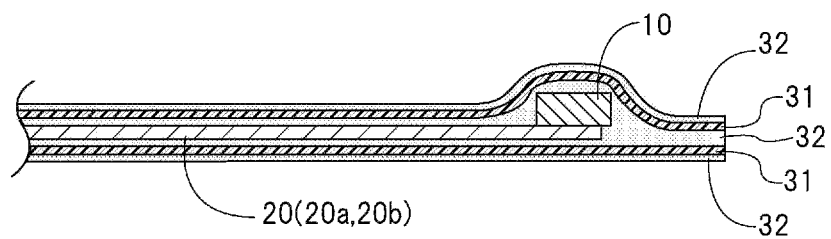
FIG. 5 is a cross-sectional view illustrating a state after the heat sensitive element is insulation-coated by the insulating films, taken along the line Y-Y of FIG. 1.

The state in which the insulating films 30a and 30b seal and insulation-coat the heat sensitive element 10 and the joint parts 21a and 21b of the lead members will be described with reference to FIGS. 4 and 5. FIG. 4 illustrates a state before being coated by the insulating films 30a and 30b, and FIG. 5 illustrates a state after coating.

The insulating films 30 illustrated in FIG. 4 has a substrate made of a thermosetting polyimide resin material and are substantially rectangular translucent films having a thickness of 100 µm or less, and specifically films having a thickness of 12.5 µm are used. In addition, the insulating films 30 have electrical insulation, high rigidity, heat resistance, and oil resistance.

Specifically, the insulating films 30 has a three-layer structure composed of a thermosetting substrate layer 31 and thermoplastic heat fusion layers 32 formed on both surfaces of the thermosetting substrate layer 31. The substrate layer 31 is made of a thermally stable polyimide resin and a layer in a stable state after a thermal reaction. On the other hand, although the thermoplastic heat fusion layers 32 are made of a polyimide resin likewise, the layers are in a thermoplastic state. That is, the substrate layer 31 is a layer in a thermally stable state, and the heat fusion layers 32 are thermally reactive thermoplastic layers. In addition, a thickness of the heat fusion layers 32 is about 2 µm and thus they are very thin layers. As described above, the configuration having the heat fusion layers 32 on both surfaces of the substrate layer 31 is applied.

Using the above constituent materials, the pair of insulating films 30a and 30b can be subjected to laminate processing by heat pressing. The heat sensitive element 10 to which the lead members 20a and 20b are connected is disposed to be sandwiched between the insulating films 30a and 30b configured as described above and undergoes heat pressing. Further, the heat sensitive film 13 side of the heat sensitive element 10 is illustrated to face the bottom in the drawings.

With respect to insulation with reliable sealing in the above-described method, if the thin film thermistor serving as the heat sensitive element 10 to which the lead members 20a and 20b are joined by welding is not very thin when sealing is performed by heat pressing with very thin heat fusion layers 32 having a thickness of about 2 μm, large bubbles or the like are generated, which makes it difficult to ensure insulation performance.

Each of the heat fusion layers 32 on the inner sides of the insulating films 30a and 30b is softened and melted to be heat-fused by heat pressing as illustrated in FIG. 5. Thus, the heat sensitive element 10 and the joint parts 21a and 21b of the lead members are sandwiched by the pair of insulating films 30a and 30b on both sides while being heat-fused, sealed to be in close contact with each other, and insulation-coated. A total thickness of the insulation-coated heat sensitive element 10 can be 250 μm or less, or preferably 100 μm or less. The formation of the thermoplastic heat fusion layers 32 on both surfaces as described above may make attachment to a detection target easier.

Further, the heat fusion layers 32 may be formed on at least one surface (inner surface). In addition, a thermoplastic material forming the insulating films is not limited to a polyimide resin. A softer material compared to a polyimide resin may be used in a method for further improving insulation performance. If a polyamide resin is used in such a case, for example, there are advantages that shape followability is improved and less bubbles or the like are generated compared to a polyimide resin.

Further, the pair of insulating films 30a and 30b preferably have an identical shape and size relationship to enable standardization of members. However, it is not necessary to have an identical shape and size relationship, and shapes and the like may be different. In addition, if the insulating films 30a and 30b are composed of a material having biocompatibility, the above-described heat sensitive element can be favorably applied to the field of medical equipment. Polyimide resins are materials having confirmed biocompatibility.

Because the substrate layers 31 of the insulating films 30a and 30b are not softened and melted due to heat pressing, only the thermoplastic heat fusion layers 32 have a reaction of softening and melting and thus can be heat-fused as described above. As a result, the heat sensitive element 10 can be reliably sealed and insulation-coated.

Figure 6:
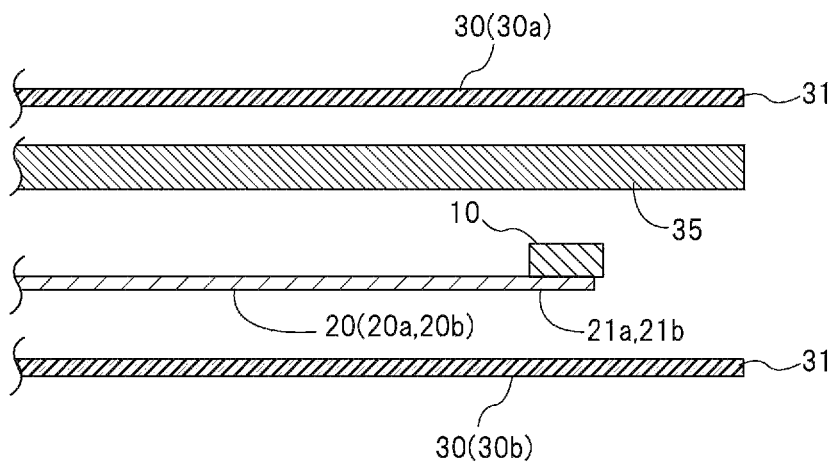
FIG. 6 is a cross-sectional view illustrating a modified example (Example 1) of a state in which the heat sensitive element is similarly insulation-coated by the insulating films.

Next, a modified example (Example 1) in which a thermosetting film 35 is used as illustrated in FIG. 6 will be described. The thermosetting film 35 is interposed between the insulating films 30a and 30b as a thermosetting layer. A thickness of the thermosetting film 35 is preferably 40 μm or less.

In the present example, each of the insulating films 30a and 30b is formed of a single thermosetting substrate layer 31. The substrate layer 31 is a layer in a stable state after a heat reaction. In addition, the thermosetting film 35 is softened and melted by heat pressing to make the insulating films 30a and 30b integrated with the heat sensitive element 10, and thereby seals and insulation-coats the heat sensitive element 10. Further, the thermosetting film 35 may be formed of a material that is joined to either of the thermally stable insulating films 30a and 30b to form a layer thereon.

A method of the related art adopts a configuration in which two thermosetting or thermoplastic films having a thickness of about 40 μm are used to sandwich a heat sensitive element joined to lead members with solder or the like from above and below. In this case, the solder joining material (additional material) makes thinning difficult, and thus unless two thermosetting or thermoplastic films having a thickness of about 40 μm are used, satisfactory sealing with less bubbles is not achieved.

According to the present example, the heat sensitive element 10 can be thinner and can be reliably sealed and insulation-coated.

For the thermosetting film 35, a thermosetting film 35 having a high infrared emissivity may be interposed. The thermosetting film 35 is an epoxy resin containing a filler and an emissivity in the infrared region can be 90% or higher. For this reason, if the thermosetting film 35 is interposed, light reception energy of the heat sensitive element 10 can increase and sensitivity to infrared light can be improved.

Next, a modified example (Example 2) in which a metal foil 36 is used will be described with reference to FIGS. 7 and 8. The metal foil 36 made of an aluminum material is provided on, for example, an outer surface of at least one of the insulating films 30a and 30b. The metal foil 36 is heat-fused to the heat fusion layer 32 on an outer side of the insulating film 30a by heat pressing. Further, the metal foil 36 may be provided on outer surfaces of both the insulating films 30a and 30b.

According to the present example, because infrared light is reflected on the metal foil 36, the effect of disturbing infrared light can be reduced, and a temperature can be correctly detected. Furthermore, by reducing the effect of infrared light with the metal foil 36 provided on both sides, a temperature sensor suitable for measurement of air temperatures can be configured.

Subsequently, a modified example for joining of the heat sensitive element 10 to the lead members 20 will be described with reference to FIGS. 9(a) and (b). The tips of the joint parts 21a and 21b of the lead members 20a and 20b have recesses 23a and 23b having a thinner thickness compared to other parts formed by means of half etching, or the like. The heat sensitive element 10 is disposed in the recesses 23a and 23b, and the electrode layers 12a and 12b of the heat sensitive element 10 are electrically connected to the joint parts 21a and 21b of the lead members 20a and 20b by welding.

Furthermore, another embodiment of the heat sensitive element will be described with reference to FIG. 10 (first embodiment) and FIG. 11 (second embodiment). Unless specified otherwise, the heat sensitive element has the same configuration as that described above.

First Embodiment

In the present embodiment, a pair of external electrode parts 12c and 12d that are formed on the insulating substrate 11 to be connected to exposed parts of the electrode layers 12a and 12b are provided as illustrated in FIG. 10. The external electrode parts 12c and 12d are portions to which the joint parts 21a and 21b of the lead members 20a and 20b are joined by welding, and as a low melting point metal, gold (Au), silver (Ag), copper (Cu) or an alloy including at least one kind thereof as a main component may be used.

Second Embodiment

In a heat sensitive element 10 of the present embodiment, electrode parts 12c and 12d can be formed as multi-layered films, and joint parts 21a and 21b of lead members 20a and 20b can be joined by welding while damage to an insulating substrate 11 is curbed.

The heat sensitive element 10 includes the insulating substrate 11, a pair of electrode layers 12a and 12b formed on the insulating substrate 11, the electrode parts 12c and 12d that are electrically connected to the pair of electrode layers 12a and 12b, respectively, a heat sensitive film 13 formed on the insulating substrate 11, and a protective film 14 formed on the heat sensitive film 13 as illustrated in FIG. 11. The pair of electrode parts 12c and 12d are provided on the insulating substrate 11 to face each other with the heat sensitive film 13 interposed therebetween. Each of the pair of electrode parts 12c and 12d is electrically connected to the heat sensitive film 13 via the electrode layers 12a and 12b formed on the insulating substrate 11.

The electrode parts 12c and 12d are multi-layered films having three functional layers. That is, the electrode parts 12c and 12d are formed on the insulating substrate 11, containing a high melting point metal as a main component, and includes an active layer 15 having an adhesive property, a barrier layer 16 that is formed on the active layer 15 as a layer integrated therewith or independent therefrom and contains a high melting point metal as a main component, and a joint layer 17 that is formed on the barrier layer 16 and contains a low melting point metal as a main component. The high melting point mentioned here means a temperature higher than a melting point of a low melting point metal.

The active layer 15 is formed to adhere to a surface of the insulating substrate 11, and has a function of increasing adhesive strength between the insulating substrate 11 made of a material such as ceramic and the electrode parts 12c and 12d, and realizing excellent tensile strength when the lead members 20a and 20b are joined to the electrode parts 12c and 12d. In addition, the active layer 15 satisfies the condition of a high melting point, and specifically has a melting point of 1300° C. or higher, and preferably 1400° C. or higher. A material of that type can also have a characteristic of not melting during a welding process to join the lead members 20a and 20b to the electrode parts 12c and 12d. A material satisfying the above-described functions and conditions of the active layer 15 is any of titanium, chromium, zirconium, tungsten, molybdenum, manganese, cobalt, nickel, tantalum, or an alloy or oxide thereof. Titanium has a melting point of 1688° C. for example, and thus a pure metal thereof can be used. Meanwhile, manganese has a melting point of 1246° C., for example, it can be used in a special form of a manganese oxide (melting point of 1945° C.) which is an oxide.

Particularly, in the related art, it is necessary to dispose an additional material having a thickness of several tens of μm for reducing thermal damage, such as a silver paste or a gold bump, at the joining potion of the lead members 20a and 20b and further to provide a glass protective layer in order to secure a sufficient tensile strength. On the other hand, by providing the active layer 15 in the electrode parts 12c and 12d in the present embodiment, sufficient tensile strength can be realized with a thin configuration, without providing any of a bump, a silver paste, and a glass protective layer.

Although a thickness of the active layer 15 is not particularly limited, a thickness thereof can be as thin as possible in a range in which the adhesive function can be maintained, and a layer made of metallic titanium, for example, can be thin up to 0.01 μm. Because an active metal such as titanium has extremely high activity, even an extremely thin film thereof can function as an adhesive function film.

The barrier layer 16 containing a high melting point metal as a main component is managed not to reach the melting point during the joining process of the lead members 20a and 20b to the electrode parts 12c and 12d, and thus functions as a barrier layer without melting during the process. To fulfill this function, the barrier layer 16 that is a high melting point metal satisfies the condition that the melting point thereof is at least 1300° C. or higher, and preferably 1400° C. or higher. A suitable material satisfying the condition is platinum. vanadium, hafnium, rhodium, ruthenium, rhenium, tungsten, molybdenum, nickel, tantalum, or an alloy thereof. In addition, a melting point of platinum is 1768° C. and a melting point of molybdenum is 2622° C.

The barrier layer 16 that is a high melting point metal is generally formed as an independent layer overlaid on the active layer 15. For example, the barrier layer 16 made of platinum that is a high melting point metal is formed on the active layer 15 made of titanium. However, the barrier layer 16 that is a high melting point metal may be formed as a layer with the same material as or integrated with the active layer 15.

For example, a configuration in which the barrier layer 16 made of molybdenum that is likewise a high melting point metal is formed on the active layer 15 made of molybdenum integrally or separately can also be adopted. In this case, the active layer 15 and the barrier layer 16 that is a high melting point metal are formed in the same process.

Although a thickness of the barrier layer 16 that is a high melting point metal is not particularly limited, it is set to 0.1 to 0.4 μm in this embodiment. The reason for this is that, if a thickness thereof is thinner than 0.1 μm, the melting point becomes lower due to alloying, and thus the layer is likely to melt during the welding process. If the layer is made of platinum, for example, it is desirably as thin as possible because it is an expensive material, and an optimum thickness can be, for example, 0.15 μm.

The joint layer 17 is formed as an independent layer overlaid on the barrier layer 16 that is a high melting point metal. The joint layer 17 melts and thereby forms a joining structure with respect to the lead members 20a and 20b in the welding process for the lead members 20a and 20b to join the electrode part 12c and 12d. At this time, the high melting point metal does not melt at all except for the alloyed portion of the barrier layer 16. In the welding process, the joint layer 17 quickly melts when heat or energy, for example, energy of laser welding, spot welding, pulse heat, or the like is supplied from outside via the lead members 20a and 20b. As described above, the joint layer 17 has a function of being welded with the lead members 20a and 20b in melt joining. To exhibit the function, the joint layer 17 that is a low melting point metal is required to satisfy the condition that a melting point thereof is lower than 1300° C. A suitable material that is a low melting point metal satisfying the condition is a pure metal including at least one of gold (melting point of 1064° C.), silver (melting point of 961° C.), and copper (melting point of 1085° C.) as a main component or an alloy thereof.

Although a thickness of the joint layer 17 is not particularly limited, its thickness can be as thin as possible in this embodiment, and can be thin up to 0.1 to 0.4 μm, for example, if gold is used as a material.

If thicknesses of the above three layers are set to 0.01 μm for the active layer 15. 0.15 μm for the barrier layer, and 0.2 μm for the joint layer, a total thickness of the electrode parts 12c and 12d can be 0.36 μm that is extremely thin. The layers can be easily configured at a thickness of 1 μm or less as described above.

Subsequently, a form in which the lead members 20a and 20b are joined to the electrode parts 12c and 12d (joint layer 17) of the heat sensitive element 10 having the above-described configuration by welding will be described.

The lead members 20a and 20b are joined to the joint layer 17 of the electrode parts 12c and 12d by undergoing a joining process. Here, various kinds of welding can be broadly employed to the joining process for the lead member 20a and 20b to the electrode parts 12c and 12d. Such welding broadly includes, for example, resistance welding, ultrasonic welding, friction welding, and the like which are contact welding, and laser welding, electron beam welding, and the like which are non-contact welding.

The lead members 20a and 20b are welded to the electrode parts 12c and 12d via the joint layer 17. In the welding process of the lead members 20a and 20b, the lead member 20a and 20b have a function of heating the joint layer 17 and melting with the joint layer 17 by absorbing heat or energy (e. g., energy of laser light) supplied from outside, without melting the barrier layer 16 that is a high melting point metal completely or almost, or melting only the joint layer 17 to be welded thereto. A suitable material satisfying this condition is a metal including gold, silver, and copper that are low melting point metals as main components or an alloy thereof, and a particularly suitable alloy is phosphor bronze, beryllium copper, brass, white copper, nickel silver, constantan, a copper-silver alloy, a copper-iron alloy, or a copper-gold alloy. In addition, phosphor bronze has a melting point of 1000° C. and constantan has a melting point of 1225° C. to 1300° C.

Next, a temperature sensor 40 in which the heat sensitive element 10 connected to the lead members 20a and 20b and coated by the insulating films 30a and 30b is mounted will be described with reference to FIGS. 12 to 14. FIG. 12 is a plan view of the temperature sensor. FIG. 13 is a side view of the temperature sensor, and FIG. 14 is a back view of the temperature sensor.

The temperature sensor is a non-contact temperature sensor and proximity non-contact temperature sensor. The temperature sensor is, for example, used to detect a surface temperature of a heating roller used in a fixing device such as a copier or a printer and control temperatures of the heating roller.

The temperature sensor 40 includes a holder 41 as a holding body, narrow metal plates 42a and 42b that are a pair of conductive members, and a heat sensitive element 10. Further, the above-described lead members 20a and 20b and the insulating films 30a and 30b are appropriately cut to adjust sizes so as to fit in a size of the holder 41.

The holder 41 is made of an insulating resin material in a horizontally long substantial rectangular parallelepiped shape and has a rectangular opening part 41a in a frame shape substantially at the center. In addition, a hook hole 41b is formed on one end side of the holder 41 in the longitudinal direction, and a screw hole 41c is formed on the other end side. The hook hole 41b and the screw hole 41c is used, for example, to attach the temperature sensor 40 to a fixing device. Furthermore, a pair of grooves 41d and 41e are formed on the other end side, and a pair of external extension lines 43a and 43b are arranged in the grooves 41d and 41e. The external extension lines 43a and 43b are specifically insulation-coated lead lines.

The holder 41 is held with the pair of narrow metal plates 42a and 42b fixed thereto. The narrow metal plates 42a and 42b are elastic bodies having elasticity formed by means of chemical etching, pressing, or the like and made of a low melting point metal, and a copper alloy containing copper as a main component, for example, phosphor bronze, constantan, manganin, or the like is used. The narrow metal plates 42a and 42b are held by the holder 41 by means of insert molding, or the like.

Specifically, the narrow metal plates 42a and 42b have fixing parts 421a and 421b arranged on both side walls 41f and 41g of the holder 41 in the longitudinal direction and annular parts 422a and 422b extending from one end sides of the fixing parts 421a and 421b to the opening part 41a to face each other. The annular parts 422a and 422b are joined to lead parts 22a and 22b of the lead members 20a and 20b by welding, or the like. The heat sensitive element 10 coated with the insulating films 30a and 30b as described above is positioned inside the opening part 41a. Thus, the heat sensitive element 10 is positioned in the space that is the opening part 41a formed by the frame-like holder 41. Further, the other end sides of the fixing parts 421a and 421b are buried in the holder 41 and connected to the external extension lines 43a and 43b. The external extension lines 43a and 43b are connected to a side of a device such as a fixing device via a connector, or the like, which is not illustrated.

Next, an example of a manufacturing method for the temperature sensor will be described with reference to FIGS. 15(a) to (c) and FIGS. 16(a) to (d). The heat sensitive element 10 is joined to the lead members 20 by welding, then the pair of insulating films 30a and 30b are heat-fused with the heat sensitive element 10 and the joint parts 21a and 21b of the lead members 20 sandwiched by the pair of insulating films 30a and 30b from both side to insulation-coat the heat sensitive element 10, and thereby the temperature sensor 40 is produced.

A lead frame material 2 as a material for the lead members, the heat sensitive element 10, and the insulation films 30a and 30b are prepared as illustrated in FIGS. 15(a) to (c). The lead frame material 2 is molded by performing chemical etching or the like on a copper alloy containing copper as a main component, and a plurality of lead members 20 can be produced from the lead frame material 2. The lead frame material 2 has the lead members 20 arranged in the horizontal direction that are connected by strip parts 2a and 2b serving as connecting members on both sides.

First, the heat sensitive element 10 is installed in a jig, which is not illustrated, and the joint parts 21a and 21b of the lead members 20 are disposed at the positions of the electrode layers 12a and 12b of the heat sensitive element 10 as illustrated in FIG. 16(a) (disposition process). Next, the electrode layers 12a and 12b are joined to the joint parts 21a and 21b by welding such as laser welding, or the like (welding process). Then, the strip parts 2a and 2b as connecting members on both sides of the lead frame material 2 are cut and removed (cutting process). Accordingly, a member in which the lead members 20 are electrically connected to the heat sensitive element 10 is manufactured as illustrated in FIG. 16(b). Then, the member is placed to be sandwiched by the insulating films 30a and 30b, and then disposed in a molding M of a heater plate and heat-pressed as illustrated in FIG. 16(c) and FIG. 16(d) (heat pressing process). Each of the heat fusion layers 32 inside the insulating films 30a and 30b is softened and melted to be heat-fused by the heat pressing.

In the above-described processes, the pair of insulating films 30a and 30b are heat-fused and thus can insulation-coat the heat sensitive element 10 and the joint parts 21a and 21b of the lead members 20.

Second Embodiment

Figure 17:
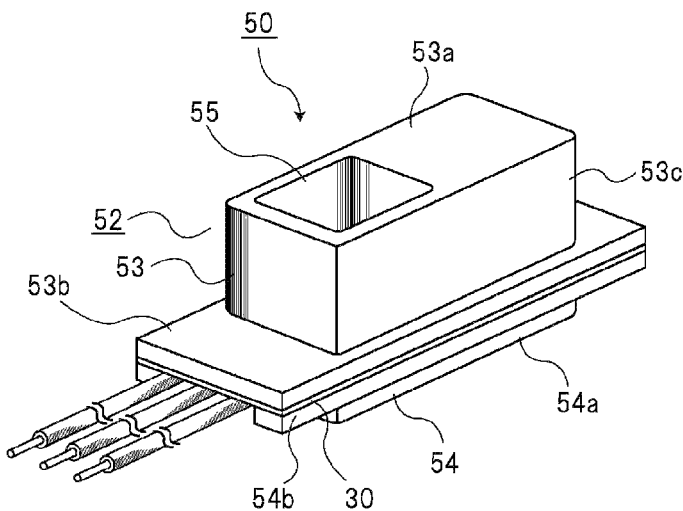
FIG. 17 is a perspective view illustrating an infrared temperature sensor as a temperature sensor according to a second embodiment of the present invention.
Figure 18:
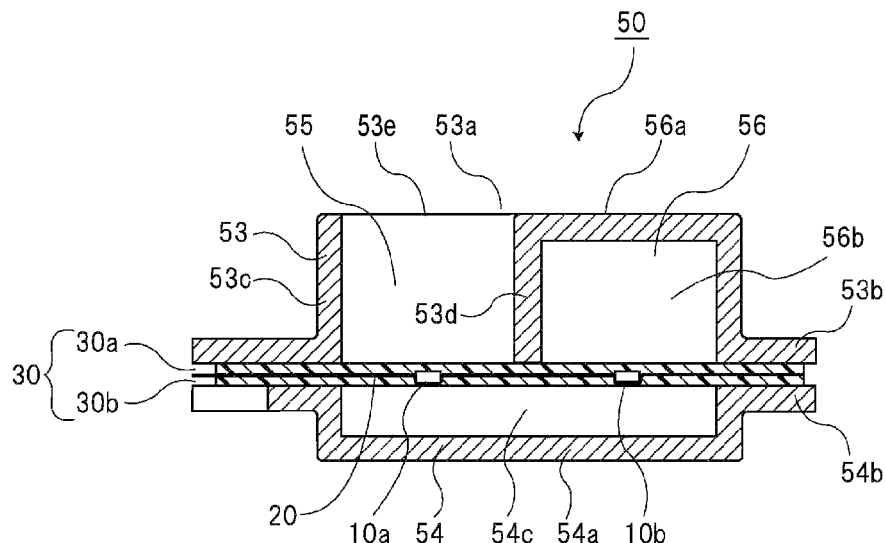
FIG. 18 is a cross-sectional view illustrating the infrared temperature sensor as the temperature sensor.
Figure 19:
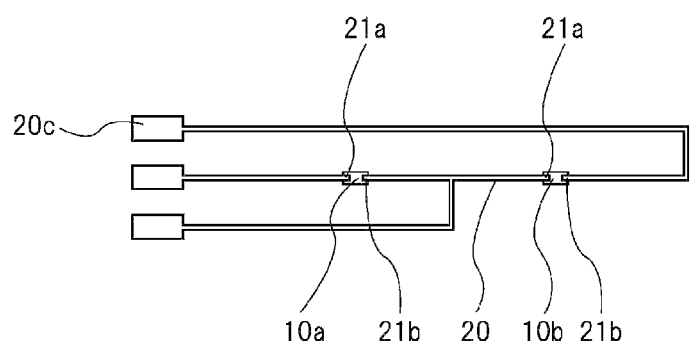
FIG. 19 is a plan view illustrating heat sensitive elements and a lead member of the infrared temperature sensor as the temperature sensor.
Figure 20:
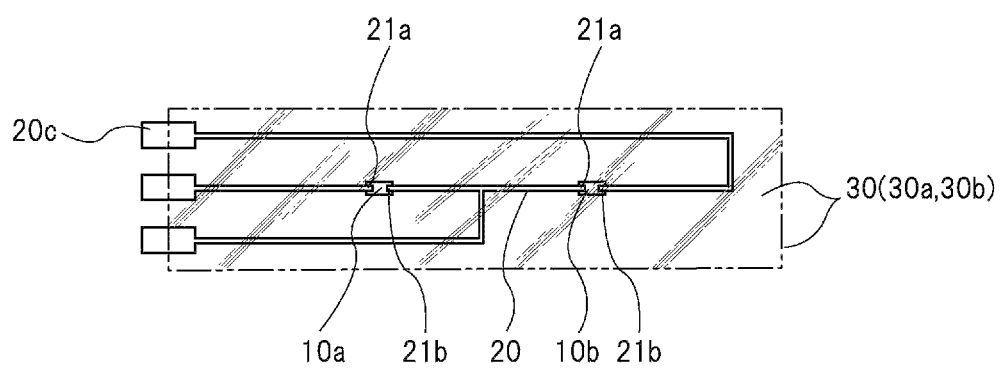
FIG. 20 is a plan view illustrating a state in which the heat sensitive elements are insulation-coated by insulating films in the infrared temperature sensor as the temperature sensor.

Next, a second embodiment will be described with reference to FIGS. 17 to 20. FIG. 17 illustrates a perspective view of a temperature sensor, and FIG. 18 illustrates a cross-sectional view of the temperature sensor. In addition, FIG. 19 illustrates a state in which a lead member is joined to heat sensitive elements, and FIG. 20 illustrates a state in which the heat sensitive elements are insulation-coated with insulation films. Further, the same reference numerals are given to the same or equivalent parts as or to those of the first embodiment, and overlapping description is omitted.

The temperature sensor according to the present embodiment is an infrared temperature sensor and non-contact temperature sensor that detects infrared light from a sensing target in a non-contact manner to measure a temperature of the sensing target. Similarly to the first embodiment, the heat sensitive elements are joined to the lead member by welding, and the heat sensitive elements and joint parts of the lead member are sandwiched and coated by a pair of insulating films from both sides.

The infrared temperature sensor 50 includes a case 52 as a holding body, a heat sensitive element for infrared detection 10a and a heat sensitive element for temperature compensation 10b, the lead member 20, and insulating films 30 as illustrated in FIGS. 17 and 18.

The case 52 includes a first case 53 and a second case 54. The first case 53 includes a substantially rectangular parallelepiped main part 53a projecting upward as illustrated and a substantially rectangular flange part 53b formed around the main part 53a. A light guiding part 55 that guides infrared light and a shielding part 56 that shields infrared light are formed in the main part 53a.

The light guiding part 55 is formed in a substantially rectangular parallelepiped tubular shape by a side wall 53c and a partition wall 53d with an opening part 53e on a front side. The partition wall 53d is positioned at a boundary part between the light guiding part 55 and the shielding part 56 to play a role of separating the light guiding part 55 and the shielding part 56.

The shielding part 56 is disposed adjacent to the light guiding part 55, and is formed substantially symmetrically with the light guiding part 55 having the partition wall 53d as an axis. The shielding part 56 has a substantially rectangular parallelepiped space part 56b formed by the side wall 53c and the partition wall 53d, having a shielding wall 56a on an upper side as illustrated. In addition, the back side facing the shielding wall 56a is opened.

The second case 54 includes a substantially rectangular parallelepiped main part 54a projecting downward as illustrated and a substantially rectangular flange part 54b formed around the main part 54a. The main part 54a is formed in a form that substantially matches the shape of the back side of the main part 53a of the first case 53, and has a space part 54c inside that seems to be continuous with the light guiding part 55 and the shielding part 56.

The lead member 20 is formed to configure a wiring path for connecting the heat sensitive element for infrared detection 10a and the heat sensitive element for temperature compensation 10b, and has external extension terminals 20c formed at terminal ends of the lead member 20 as illustrated in FIG. 19. External extension lines are connected to the external extension terminals 20c.

Similarly to the first embodiment, the lead member 20 is an elastic body having elasticity formed by means of chemical etching or pressing, thin plate-shaped metal plate having a narrow width, and lead frame. The heat sensitive element for infrared detection 10a and the heat sensitive element for temperature compensation 10b are joined to the lead member 20 by welding and electrically connected thereto.

The heat sensitive element for infrared detection 10a detects infrared light from a detection target to measure a temperature of the detection target. The heat sensitive element for temperature compensation 10b detects an ambient temperature to measure the ambient temperature. The heat sensitive element for infrared detection 10a and the heat sensitive element for temperature compensation 10b are configured as heat sensitive elements at least having substantially equal temperature characteristics.

The lead member 20 to which the heat sensitive element for infrared detection 10a and the heat sensitive element for temperature compensation 10b are joined by welding is coated by a pair of insulating films 30a and 30b while at least the heat sensitive element 10a for infrared detection, the heat sensitive element for temperature compensation 10b, and joint parts 21a and 21b of the lead member are sandwiched by the films from both sides as illustrated in FIG. 20.

The insulating films 30 sandwiching and coating the heat sensitive element for infrared detection 10a, the heat sensitive element for temperature compensation 10b, and the joint parts 21a and 21b of the lead member is interposed and fixed between the flange part 53b of the first case 53 and the flange part 54b of the second case 54 when the first case 53 and the second case 54 are combined and united. In addition, in this case, the heat sensitive element for infrared detection 10a is arranged at the position corresponding to the light guiding part 55, and the heat sensitive element for temperature compensation 10b is arranged at the position corresponding to the shielding part 56. Thus, the heat sensitive element for infrared detection 10a and the heat sensitive element for temperature compensation 10b are positioned in the space part formed by the case 52.

In the infrared temperature sensor 50 described above, infrared light emitted from a surface of a detection target is incident from the opening part 53e of the light guiding part 55, guided by the light guiding part 55, passes through the light guiding part 55, and reaches the insulating films 30. The infrared light that has reached the insulating films 30 is absorbed by the insulating films 30 and converted to heat energy.

The converted heat energy is transmitted to the heat sensitive element for infrared detection 10a and raises a temperature of the heat sensitive element for infrared detection 10a. Because the heat sensitive element for infrared detection 10a and the heat sensitive element for temperature compensation 10b have substantially equal temperature characteristics, a resistance value of the heat sensitive element for infrared detection 10a is changed by the infrared light from the detection target. Thus, the heat sensitive element for infrared detection 10a and the heat sensitive element for temperature compensation 10b change in the same way as a change of an ambient temperature, can prevent influence of thermal disturbance, and reliably detect a temperature change caused by infrared light from the detection target.

Further, it is a matter of course that the modified examples and another embodiment of the heat sensitive element described in the first embodiment can be applied to the second embodiment.

The proximity non-contact temperature sensor 40 and the infrared temperature sensor 50 according to each embodiment described above can be provided in and applied to various devices to detect a temperature of a fixing device such as a copier or a printer, information communication equipment such as a mobile communication terminal or a personal computer, video equipment, consumer equipment, and electronic equipment such as electrical equipment for automobiles. An application device is not particularly limited.

According to the embodiments of the present invention, it is possible to provide the temperature sensors 40 and 50 that can be thinned and have improved reliability with ensured insulation, and a device equipped with the temperature sensors 40 and 50.

Further, the present invention is not limited to the above-described configuration of each embodiment and can be variously modified within the scope not departing from the gist of the invention. In addition, the above-described embodiments are merely examples, and are not intended to limit the scope of the invention. The new embodiments can be implemented in other various modes, and can be subject to various omission, replacement, and modification. The embodiments and modified examples thereof are included in the scope and gist of the invention, and at the same time, included in the inventions described in the claims and the scope of equivalents thereof.

The invention claimed is:

1. A temperature sensor comprising:
a heat sensitive element having an insulating substrate, a heat sensitive film formed on the insulating substrate, and an electrode layer formed on the insulating substrate and electrically connected to the heat sensitive film;
a lead member having a joint part electrically connected to the electrode layer by being joined to the electrode layer by means of welding and a lead part integrally extending from the joint part; and
a pair of insulating films sandwiching and sealing at least the heat sensitive element and the joint part of the lead member from both sides,
the pair of insulating films at least having a pair of substrate layers made of thermosetting resin, and a heat fusion layer made of thermosetting resin between at least inner sides of the substrate layers to sandwich and seal at least the heat sensitive element and the joint part of the lead member from both sides,
the substrate layers in a stable state after a heat reaction, and the heat fusion layer is thermally reactive layer.

2. The temperature sensor according to claim 1, wherein a total thickness in a state in which the heat sensitive element and the joint part of the lead member are sandwiched and sealed by the pair of insulating films from both sides is 230 μm or less.

3. The temperature sensor according to claim 1, wherein a thickness of the insulating substrate is 100 μm or less, and a bending strength is 690 MPa or greater.

4. The temperature sensor according to claim 1, wherein a thickness of the electrode layer of the heat sensitive element is 1 μm or less.

5. The temperature sensor according to claim 1, wherein a thickness or an outer diameter of the lead member is 100 μm or less.

6. The temperature sensor according to claim 1, wherein the heat fusion layer is formed between at least inner sides of the substrate layers of the insulating films.

7. The temperature sensor according to claim 1, wherein the heat fusion layer is a film having a high infrared emissivity.

8. The temperature sensor according to claim 1, wherein a metal foil is provided on an outer surface of at least one of the pair of insulating films.

9. The temperature sensor according to claim 1, wherein the heat sensitive element is a thin film thermistor.

10. The temperature sensor according to claim 1, wherein the electrode layer of the heat sensitive element includes an active layer containing a high melting point metal as a main component, a barrier layer formed on the active layer containing a high melting point metal as a main component, and a joint layer formed on the barrier layer containing a low melting point metal as a main component.

11. The temperature sensor according to claim 1, wherein a heat conductivity of the lead member is 25 W/(m·K) or less.

12. The temperature sensor according to claim 1, wherein the lead member is made of a metal material having a melting point of 1300° C. or lower.

13. The temperature sensor according to claim 1, wherein the insulating substrate is made of a ceramic material.

14. The temperature sensor according to claim 1, wherein the insulating films are composed of a material having biocompatibility.

15. A device equipped with the temperature sensor according to claim 1.

* * * * *